United States Patent [19]

Higuchi et al.

[11] Patent Number: 5,009,871
[45] Date of Patent: Apr. 23, 1991

[54] METHOD OF REMOVING MERCURY IN EXHAUST GASES FROM A WASTER INCINERATOR

[75] Inventors: Nariyoshi Higuchi, Kanagawa; Miki Yamagishi, Tokyo; Tsuneharu Miyachi, Kanagawa, all of Japan

[73] Assignee: Nippon Kokan Kabushiki Kaisha, Tokyo, Japan

[21] Appl. No.: 144,695

[22] Filed: Jan. 13, 1988

Related U.S. Application Data

[63] Continuation of Ser. No. 832,410, Feb. 24, 1986, abandoned.

[30] Foreign Application Priority Data

Aug. 31, 1984 [JP] Japan ................... 59-180698

[51] Int. Cl.⁵ .................. B01D 53/34; C25B 11/04
[52] U.S. Cl. .................... 423/240; 204/292; 423/210
[58] Field of Search ............ 423/210, 240 R; 55/72; 204/292, 435; 436/135, 150, 904

[56] References Cited

U.S. PATENT DOCUMENTS 3,838,190 9/1974 Birke et al. ................... 423/210
4,233,274 11/1980 Allgulin ......................... 55/72
4,729,882 3/1988 Ide et al. ........................ 423/210

FOREIGN PATENT DOCUMENTS 3326832 2/1985 Fed. Rep. of Germany ...... 423/240
122486 9/1975 Japan ............................... 423/210
1423 1/1982 Japan ............................... 423/240
1121845 7/1968 United Kingdom ............. 423/210

OTHER PUBLICATIONS

Berry's Chemical Engineers' Handbook, 6th ed., Ed. by Perry et al., McGraw-Hill Book Co., 1984, pp.22-50.

Primary Examiner—Jeffrey E. Russel
Attorney, Agent, or Firm—Fleit, Jacobson, Cohn, Price, Holman & Stern

[57] ABSTRACT

A method of removing mercury from the exhaust gases of a waste incinerator. The method is applied to a gas-liquid contact-type smoke cleaner so that the exhaust gases emitted from the waste incinerator are washed with a washing liquid to which an oxidizing agent is added so as to attain an oxidation-reduction potential or COD value such that mercury existing in the form of mercuric chloride and mercury forming complex ions with chlorine in the washing liquid are not reduced by reducing substances present in the washing liquid.

3 Claims, 4 Drawing Sheets

METHOD OF REMOVING MERCURY IN EXHAUST GASES FROM A WASTER INCINERATOR this application is a continuation of application Ser. No. 832,410 filed Feb. 24, 1986, now abandoned.

BACKGROUND OF THE INVENTION

1. Field of the Invention

The present invention relates to a method of removing mercury from waste incinerator exhaust gases and more particularly to a mercury removing method in which exhaust gases containing as constituents mercury and hydrochloric acid are washed with a washing liquid and the mercury is dissolved in the form of mercuric chloride and mercury forming complex ions with chlorine into the washing liquid thereby removing the mercury from the exhaust gases with high efficiency.

2. Description of the Prior Art

The harmful substances contained in the exhaust gases from a waste incinerator have heretofore been governed by the regulations from the standpoint of environmental pollution prevention. The harmful substances have included hydrogen chloride (HCl) and sulfur dioxide ($SO_2$) and thus these harmful substances have been removed by harmful gas cleaning apparatus employing the dry process, the semi-dry process and the wet process.

Then, it has recently been found that the exhaust gases from waste incinerators have contained mercury in an amount exceeding the environmental guideline of 0.015 mg/$m^3$ provided by the World Health Organization (WHO) and this has become an object of public concern.

In fact, however, the existing waste incinerator harmful gas cleaning apparatus of the dry, semi-dry and wet processes have all been designed to mainly remove hydrogen chloride (HCl) and sulfur dioxide ($SO_2$) thus making the removal of mercury difficult and only the apparatus of the wet process have been capable of removing a trace amount of mercury.

On the other hand, the known means of removing the mercury from gases include the techniques of removing mercury from the hydrogen gas produced during the production of caustic soda by the mercury method. However, these techniques have been designed to remove the mercury entering as mercury vapor into the hydrogen gas from the electrolytic cell or the mercury accompanying the hydrogen gas produced. In other words, these techniques have been designed to remove the mercury present in the form of metal mercury in the hydrogen gas. On the contrary, the waste incinerator involves various chlorine generating factors, such as, chlorine gas and hydrogen chloride gas and these gases react with mercury. Thus, the mercury is mostly contained in the form of mercuric chloride in the exhaust gases. As a result, the known techniques of removing mercury from hydrogen gas, which have been used with the caustic soda production processes by the mercury method, cannot be applied as such to the removal of mercury, particularly mercuric chloride contained in the exhaust gas from a waste incinerator.

SUMMARY OF THE INVENTION

The present invention has been made as a result of various studies and research works made with a view to overcoming the foregoing deficiencies in the prior art, and it is an object of the invention to provide an improved method of removing mercury from the exhaust gases of a waste incinerator which is operated so that the exhaust gases containing mercury and hydrochloric acid as constituents are washed with a washing liquid and an oxidizing agent is added in such a manner that reducing substances dissolved into the washing liquid from the exhaust gases are prevented from reducing the mercury present as mercuric chloride and mercury forming complex ions with chlorine in the washing liquid while preventing any excessive addition of the oxidizing agent.

DESCRIPTION OF THE PREFERRED EMBODIMENTS

Figure 1:
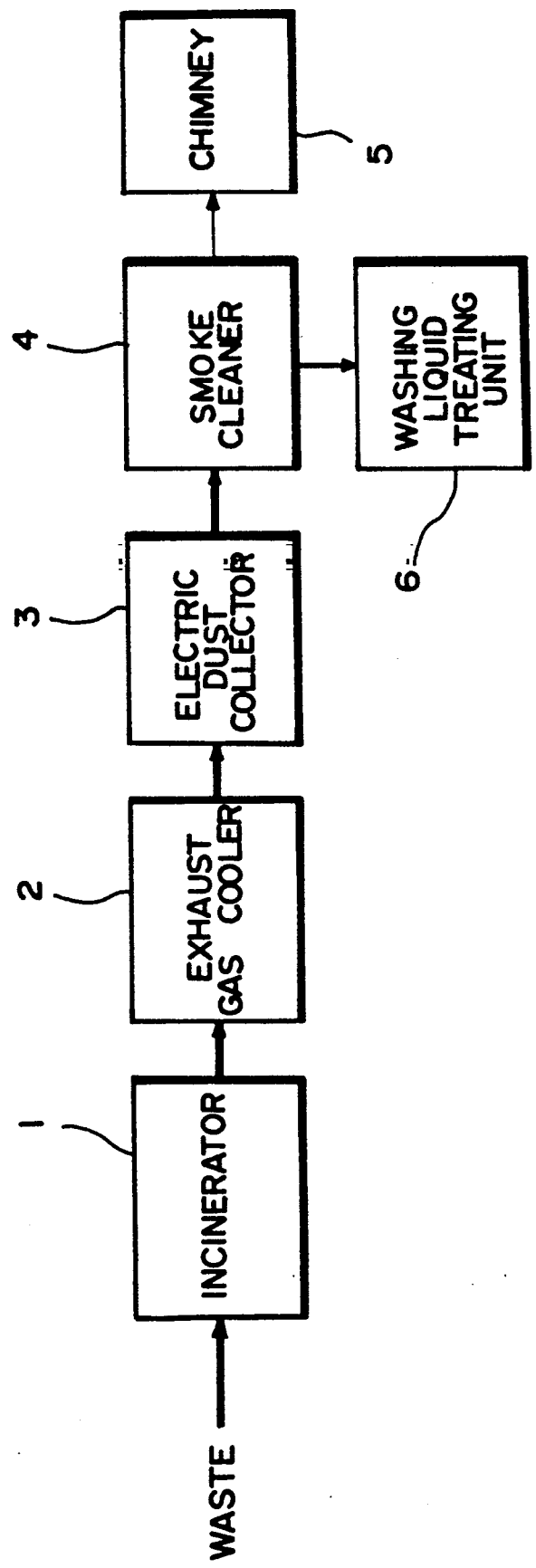
FIG. 1 is a block diagram of a waste incineration process incorporating a smoke cleaner to which the present invention is applied.

The present invention is readily applicable to not only the existing waste incineration processes but also to any waste incineration process designs to be newly built and the invention is intended to remove mercury from the exhaust gases in the proper range from the operation and maintenance point of view of the actual apparatus.

Since the waste materials involve various chlorine generating factors such as chlorine gas and hydrogen chloride gas, the mercury in the exhaust gases emitted from a waste incinerator reacts with these chlorine gas and hydrogen chloride gas and almost all the mercury is converted to mercuric chloride. Then, the solubility of mercuric chloride in water is 3.6 g/100 ml at 0° C. and 61.3 g/100 ml at 100° C. and there is known a method of washing the exhaust gases with a large quantity of water to dissolve the mercuric chloride in the water and thereby removing the mercury in the exhaust gases. However, since the exhaust gases from the incinerator contain hydrochloric acid and sulfur dioxide, the washing of the exhaust gases with an alkaline solution is necessary and moreover washing the exhaust gases with a large quantity of water for removing the mercuric chloride is practically difficult since this requires the use of means for the disposal of a large quantity of diluted alkaline solution. Also, a method is known in which a large quantity of powerful oxidizing agent is used to decompose and convert mercuric chloride to ionic mercury and the ionic mercury is washed by utilizing the polarity of water. However, the addition of such powerful oxidizing agent in any excessive amount cause corrosion of the apparatus and the means involving such corrosion of the apparatus is not desirable from the operation and maintenance standpoint of the apparatus.

Thus, in the case of the existing waste incineration processes, the smoke cleaner utilizes a method in which the exhaust gases are brought into contact with a suitable amount of washing liquid or alkaline solution in a washing tower such as a spray tower or tray tower so that the harmful substances in the exhaust gases, e.g., hydrochloric acid and sulfur dioxide are reacted with the alkali and the resulting salts are extracted from the bottom of the tower. It has been considered that in such a case, the mercuric chloride is dissolved completely into the washing liquid owing to its extremely high solubility and that, while the mercuric chloride in the form of simple salt is unstable, the mercuric chloride forms and stabilizes as complex salts in the presence of soluble chlorides such as ammonium chloride ($NH_4Cl$) and sodium chloride (NaCl) and it exists in the form of stable mercuric chloride in the washing liquid.

Moreover, it has been confirmed that 10 to 15% of various salts such as sodium chloride (NaCl) and sodium sulfate ($Na_2SO_4$) coexist in most alkaline solution washing liquids subjected to the washing of such waste incinerator exhaust gases and also there is the coexistence of salts of soluble chlorides which form complex salts with mercuric chloride, and it has been considered that the mercuric chloride forms complex salts and dissolves in a stable form in the washing liquid.

However, various studies made by the inventors has shown that the mercuric chloride in the exhaust gases dissolves in the form of mercuric chloride and mercury forming complex ions with chlorine in the washing liquid and that the mercury chloride is easily reduced by various reducing substances such as sulfite existing in the washing liquid to become metal mercury having practically no solubility in water and the metal mercury is volatilized and scattered into the atmosphere from the washing liquid.

Thus, in accordance with the invention the reducing substances in the washing liquid are oxidized so as to cause no corrosion of the apparatus and the reduction of mercury in the form of mercuric chloride and mercury forming complex ions with chlorine is prevented thereby exhausting the mercury in its stable dissolved form in the washing liquid.

FIG. 1 is a block diagram of a waste incineration process incorporating a smoke cleaner to which the present invention is applied. Waste materials are charged into an incinerator 1 so that the waste materials are burnt at 900° C. to 1200° C. and the resulting exhaust gases are cooled to about 300° C. in an exhaust gas cooler 2. Then, after the dust has been removed by an electric dust collector 3, the exhaust gases are introduced into a harmful gas cleaner or smoke cleaner 4 through its lower part so that in the smoke cleaner 4 comprising a counter current-type or parallel current-type spray tower, tray tower, packed tower or the like, the exhaust gases are contacted with an alkaline solution such as caustic soda and the harmful substances such as hydrochloric acid and sulfur dioxide are reacted with the alkaline thereby removing them in the form of salts such as sodium chloride (NaCl) and sodium sulfate ($Na_2SO_4$). On the other hand, the mercury emitted from the incinerator 1 is almost entirely converted to mercuric chloride ($HgCl_2$) due to the coexistence of chlorine and hydrochloric acid inherent to the incinerator exhaust gases and the mercuric chloride is brought into contact with the washing liquid or the alkaline solution in the smoke cleaner 4. Regarding the alkaline solution, a 20% caustic soda solution is for example added and the weak alkaline solution is used.

The alkaline solution washed and exhausted from smoke cleaner 4 is not discharged to prevent environmental pollution. Therefore, the alkaline solution is cleaned first by means of washing liquid treatment unit 6 and is then discarded. On the other hand, the incineration exhaust gases are cleaned by smoke cleaner 4 first, and are then discharged from chimney 5 into the atmosphere.

In accordance with the invention, under these conditions of the washing tower in the existing smoke cleaner 4, the reducing substances tending to reduce the mercuric chloride and mercury forming complex ions with chlorine in the washing liquid are oxidized. The reducing substances are oxidized in such a manner that only the reducing substances present in the washing liquid are oxidized and the smoke cleaner is not corroded by the addition of an oxidizing agent in an excessive amount. For this purpose, the amount of the reducing substances in the washing liquid is measured and a controlled amount of the oxidizing agent corresponding to the amount of the reducing substances is added to the washing liquid. While it is conceivable, as the method for this purpose, to directly measure the amount of such reducing substance as sulfite serving as a reducing agent in the washing liquid, the direct measurement of sulfite tends to be affected by the coexisting gas components and also it is difficult to determine the concentrations of the exhaust gas components for each of different incinerators thus making this attempt inpractical. It is also apparent that there exist other reducing substances than sulfur oxides, such as, sulfite and thus the measurement of sulfite cannot be used as a guide required directly for adding an oxidizing agent in an amount required to prevent the reduction of mercuric chloride.

On the other hand, the studies and research made by the inventors of this invention have shown that there is a correlation between the amount of reducing substances tending to reduce mercuric chloride and mercury forming complex ions with chlorine in a washing liquid and variations in the oxidation-reduction potential of the washing liquid. Thus, in accordance with the invention, noting the fact that the reducing substances also enter the washing liquid from the exhaust gases and the amount varies depending on the waste composition and burning conditions of each waste incinerator, after preliminarily measuring the oxidation-reduction potential of the washing liquid, adding an oxidizing agent to the washing liquid until the mercuric chloride and the mercury forming complex ions with chlorine are no longer reduced and measuring the corresponding variations in the oxidation-reduction potential and then determining that value of the oxidation-reduction potential which prevents these mercury from being reduced to form metal mercury, the oxidizing agent is added to the washing liquid so as to maintain this value of the oxidation-reduction potential. Thus, it is apparent that not only the mercury is allowed to dissolve as mercuric chloride and mercury forming complex ions with chlorine but also the entry of an oxidizing agent in any excessive amount is prevented thus preventing the occurrence of any corrosion of the smoke cleaner, while preventing the mercury from being volatilized and scattered due to the addition of the oxidizing agent in any excessively small amount.

It is to be noted that the oxidation-reduction potential can be measured by using an electrode i.e., a sensing electrode composed of a combination of different metal electrodes, made by a combination of silver chloride and platinum (Pt), an electrode made of silver chloride and gold (Au) or the like.

From the results of the measurement by a composite electrode of silver chloride and platinum of the oxidation-reduction potential of a washing liquid in a washing tower of a certain incineration process it has been found that the oxidizing agent should be added at a potential of about 300 mV or higher. A proper composite electrode for the washing liquid is used by suitably selecting it in dependence on the substances which enter and coexist in the washing liquid and a composite electrode of silver chloride and platinum may be used with the ordinary washing liquid.

Figure 2:
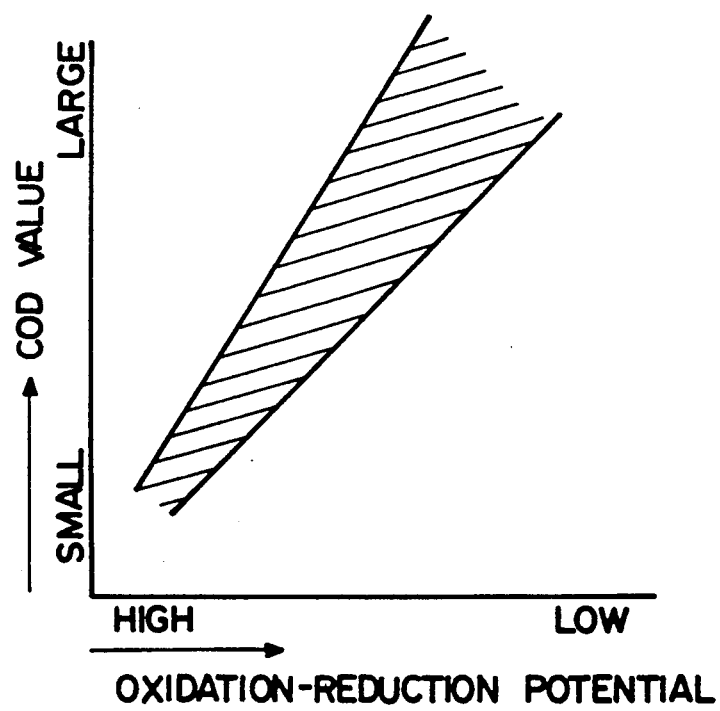
FIG. 2 is a graph showing the relation between the COD value (the chemical oxygen demand) and the oxidation-reduction potential of the washing liquid in the smoke cleaner.

As regards the COD value of the washing liquid, due to the fact that not only the amount of reducing substances such as sulfite but also the amount of reducing substances such as organic matter are measured, theoretically it has not been made clear how the COD value is related with the oxidation-reduction potential of the washing liquid. However, the studies and research made by the inventors of this invention, etc., have shown that there is an approximate correlation between the COD value and the oxidation-reduction potential of the washing liquid as shown in FIG. 2 and that the COD value can be utilized for the purpose of controlling the amount of addition of the oxidizing agent in the like manner as the oxidation-reduction potential.

Thus, by measuring the COD value of the washing liquid and then adding the oxidizing agent to the washing liquid and measuring the COD value of the washing liquid at which mercuric chloride is no longer reduced and volatilely scattered as metal mercury, it is possible to control the amount of addition of the oxidizing agent to the washing liquid in accordance with the COD values in this range. It has been found that with the washing liquid of a washing tower in a certain waste incineration process, by adding an oxidizing agent so as to limit the value of COD to 100 mg/l or less, it is possible to prevent the reduction of mercuric chloride and mercury forming complex ions with chlorine.

Figure 3:
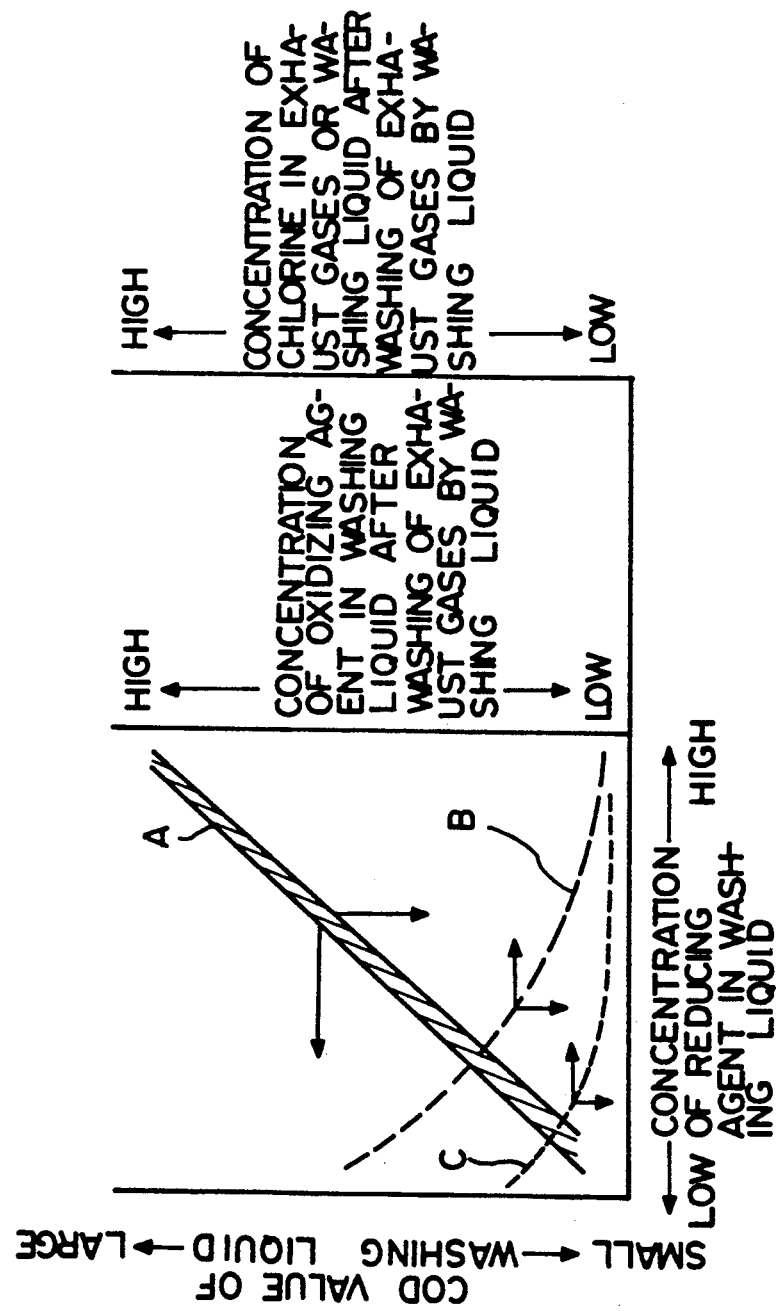
FIG. 3 is a graph showing the relation between the reducing substances in the washing liquid of the smoke cleaner and the COD value, the relation between the concentrations of the oxidizing agent and the reducing agents in the washing liquid in a case where the exhaust gases are washed with the washing liquid containing the oxidizing agent and the relation between the concentration of the chlorine in the exhaust gases or the washing liquid and the concentration of the reducing agents in the washing liquid in the same case.

Also, the inventors of this invention have investigated into the concentration of chlorine in the exhaust gases after the washing with a washing liquid containing hypochlorite as an oxidizing agent and it has been found that the quantitative relation between the concentration of chlorine in the exhaust gases and the concentrations of reducing substances, oxidizing agent and chlorine in the washing liquid varies while maintaining a definite relation as shown in FIG. 3.

In the Figure, symbols A and B indicate the same washing liquid and C the exhaust gases There is a proportional relation between the reducing substance concentration and COD value of the washing liquid A and the amount of the reducing substances in the washing liquid B and the concentrations of the oxidizing agent and chlorine in the washing liquid B vary while maintaining a proportional relation.

It has been found that the chlorine concentrations of the exhaust gases washed with the washing liquids A and B and the amounts of the reducing substances in the washing liquids A and B vary with quantitative proportional relations. While the waste materials of the waste incinerators differ from one incinerator to another with the resulting variations in the concentrations of the exhaust gas components, the results of the long-term analysis of the exhaust gas compositions of the waste incinerators in various regions have shown that the variations in exhaust gas composition among the waste incinerators of any given region are not so large.

Thus, where the exhaust gases are washed with a washing liquid containing hypochlorite as an oxidizing agent, it is also possible to preliminarily measure the variations in the amounts of reducing and oxidizing agents and chlorine in a washing liquid and the chlorine concentration of the exhaust gases after washing and present the definite relations as data as shown in FIG. 3, so that thereafter the chlorine concentration of the washing liquid or the exhaust gases after washing is measured continuously and the amount of addition of the oxidizing agent is controlled in accordance with the chlorine concentration of the washing liquid or the chlorine concentration of the exhaust gases after washing at which the mercuric chloride and mercury forming complex ions with chlorine in the washing liquid are no longer reduced.

The oxidizing agent used with the invention may comprise an alkaline solution, acid solution or the like which discharges oxygen in the washing liquid. It is to be noted that the oxidizing agent is decomposed to form oxygen and given ions in the washing liquid with the resulting giving and receiving of electrons and thus a consideration must be given to their reactions with the salts and ions coexisting in the washing liquid. From this point of view, the use of hypochlorite or hydrogen peroxide is preferred. While the hypochlorite is a salt of hypochlorous acid (HClO) and a variety of salts may be used, sodium hypochlorite is well suited from the handling point of view.

In particular, the hydrogen peroxide produces no corrosive gas upon decomposition and therefore its use is preferred in the case of a washing tower made of materials having no corrosion resistance.

It is to be noted that the production of oxygen takes place as shown by the following formulas. In the case of hypochlorite which is alkaline

$$2ClO^- \rightarrow 2Cl^- + O_2 \quad (1)$$

In the case of hydrogen peroxide

$$H_2O_2 \rightarrow \tfrac{1}{2} O_2 + H_2O \quad (2)$$

In this way, the reducing substances are oxidized and the reduction of mercuric chloride and mercury forming complex ions with chlorine is prevented.

While the hypochlorite and hydrogen peroxide may each be added in the form of a single substance, the addition in the form of an aqueous solution is preferred from the handling point of view.

While the smoke cleaner to which the invention is applied may be of either the batch type or the continuous type, the actual apparatus should preferably be of the continuous type from the standpoint of ease of operation. While the continuous-type smoke cleaner may be any apparatus provided that it provides a gas-liquid contact continuously, particularly the use of a spray tower or tray tower is preferred.

The oxidizing agent may be added into the washing liquid staying in the lower part of the tower or any other suitable place within the tower or alternatively the oxidizing agent may be added to the washing liquid which has been removed from the tower and stored in a separate tank. Also, while the washing liquid in the form of an alkaline solution can wash hydrochloric acid, etc., in the exhaust gases and thus is suitable for the purposes, the washing liquid may be neutral or acidic.

Figure 4:
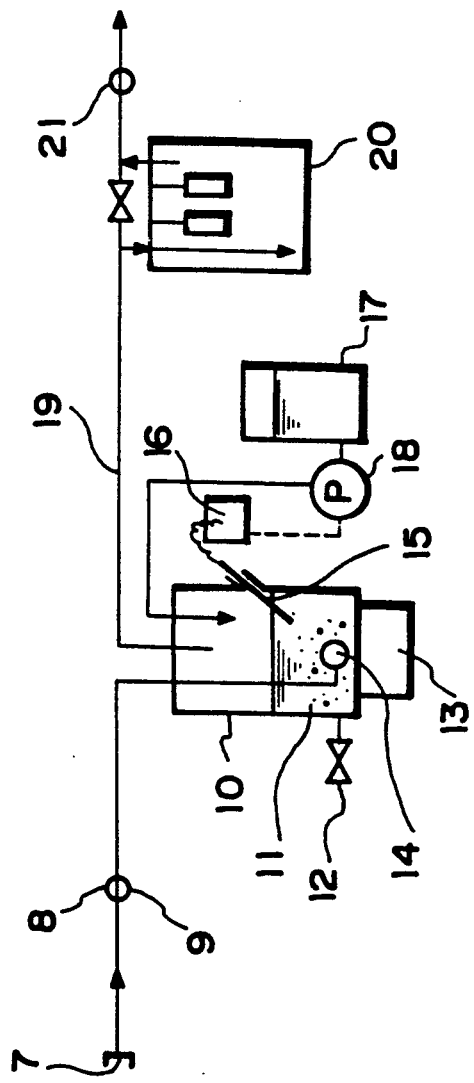
FIG. 4 is a schematic diagram of an experiment apparatus for carrying out the invention.

FIG. 4 is a schematic diagram of an apparatus used in making experiments on the invention. In the Figure, numeral 7 designates an exhaust gas outlet of an electric dust collector, and 8 a pipe connected to the outlet 7 for the purpose of extracting experimental exhaust gases. Numeral 9 designates a sampling point for analyzing the exhaust gases before their entry into a washing apparatus. Numeral 10 designates a glass container having an effective volume of 1 l and forming the experimental washing apparatus, and 11 the washing liquid extracted from the washing liquid used in the washing tower of the smoke cleaner in the actual waste incineration process and stored in the container 10. Numeral 12 designates a valve fitted to the container 10 for sampling purposes to measure the COD value of the washing liquid as occasion demands. Numeral 13 designates a temperature controller for maintaining the temperature of the washing liquid at the same temperature as in the actual apparatus.

Numeral 14 designates an air-diffusing bowl connected to the pipe 8 to blow diffusely the exhaust gases into the washing liquid. Numeral 15 designates an electrode of an oxidation-reduction potential measurer 16 and it comprises a composite electrode of silver chloride (AgCl) and platinum (Pt) in this embodiment. Numeral 17 designates a container containing an aqueous solution of sodium hypochlorite (or any other oxidizing agent) and the aqueous solution of sodium hypochlorite is added to the washing liquid by a pump 18. Numeral 19 designates a pipe for discharging the exhaust gases washed with the washing liquid 11 and the gases are discharged after circulating within a container 20. Mounted at the end of the pipe 19 is a sampler 21 for analyzing the washed exhaust gases and also suspended in the container 20 are test pieces of steel for structure and stainless steel materials, respectively, for the purpose of performing a corrosion test on the materials of the apparatus.

A washing liquid comprising an aqueous solution containing salts (NaCl, $Na_2SO_4$, etc.) and having a concentration of about 10% was supplied into the container 10 of the experimental apparatus constructed as mentioned above. Then, the exhaust gases were blown at the rate of about 1 l/min into the washing liquid and were washed while maintaining the pH at 8. Sodium hypochlorite or hydrogen peroxide was continuously added to the washing liquid under manual control while continuously measuring the oxidation-reduction potential of the washing liquid and also extracting the washing liquid at intervals of 30 minutes and measuring the COD value by the method of JIS K 0102. Each continuous running time for experiment was 6 hours and the test pieces in the container 20 were judged by visual observation with the exposure time of 30 hours.

The percentage removal of mercury from the exhaust gases was determined from the ratio between the mercury concentrations of the exhaust gases measured before and after the washing with the washing liquid 11. Also, the chlorine was measured by measuring outlet exhaust gases 21 by the method of JIS K 0106.

The results of the above experiments were as shown in the following tables.

TABLE 1

| | Washing Liquid | | | Exhaust gases | | Degree of |
| Test No. | Oxidation-reduction potential | $p^H$ | Oxidizing agent | Percentage removal of mercury | Outlet concentration of chlorine | corrosion of materials by exhaust gases |
| --- | --- | --- | --- | --- | --- | --- |
| 1 | 530 mV | 8 | Sodium hypochlorite | 80% | Undetected | Slight |
| 2 | 105 mV | 8 | None | 12% | " | Slight |
| 3 | 820 mV | 8 | Sodium hypochlorite | 81% | Detected | Scattered corrosion |

TABLE 2

| | Washing Liquid | | | Exhaust gases | | Degree of |
| Test No. | COD | $pH$ | Oxidizing agent | Percentage removal or mercury | Outlet concentration of chlorine | corrosion of materials by exhaust gages |
| --- | --- | --- | --- | --- | --- | --- |
| 4 | 11 mg/l | 8 | Sodium hypochlorite | 88% | — | Scattered corrosion |
| 5 | 30 mg/l | 8 | Sodium hypochlorite | 74% | — | Slight |
| 6 | 105 mg/l | 8 | Sodium hypochlorite | 22% | — | Slight |
| 7 | 150 mg/l | 8 | Sodium hypochlorite | 10% | — | Slight |
| 8 | 20 mg/l | 8 | Hydrogen peroxide | 85% | — | Slight |

With the tests in the above Tables 1 and 2, the tests 1 to 3 controlled the amount of addition of the oxidizing agent in accordance with the oxidation-reduction potential and the tests 4 to 8 controlled the amount of addition of the oxidizing agent in accordance with the COD value. Also, with the washing liquid in the tests 1 to 3, the oxidation-reduction potential was 710 mV in a condition where the mercuric chloride was not reduced, whereas with the washing liquid in the tests 4 to 8, the COD value was 15 mg/l in a condition involving no reduction of the mercuric chloride.

From the results of the tests it will be seen that if the exhaust gases are washed by adding an oxidizing agent to the washing liquid in such a manner that the oxidation-reduction potential or the COD value of the washing liquid approximates a value at which the mercuric chloride and mercury forming complex ions with the chlorine are no longer reduced, the mercury in the exhaust gases is removed with a high yield and the corrosion of the apparatus is reduced.

From the foregoing description it will be seen that in accordance with the invention, by virtue of the fact that the amount of addition of an oxidizing agent is controlled in accordance with the oxidation-reduction potential or the COD value of the washing liquid, the invention is applicable to the washing device of the harmful gas cleaner in newly-built waste incineration processes as well as the existing ones. Also, the fact that the mercuric chloride is dissolved into the washing liquid in the washing device has the effect of simplifying the washing liquid treating step and preventing the mercury from being volatilized and scattered into the atmosphere thereby contributing toward the prevention of environmental pollution.

We claim:

1. A method of removing mercuric chloride contained in exhaust gases emitted from a waste incinerator comprising the steps of:
   (a) providing smoke cleaning means for washing the exhaust gases emitted from said waste incinerator by contacting the same with a washing liquid which is an alkaline solution:
   (b) measuring at least one of an oxidation-reduction potential, COD value, chlorine concentration, and oxidizing agent concentration of said washing liquid before said washing, or a chlorine concentration in said exhaust gases after said washing;
   (c) adding an oxidizing agent to said washing liquid to such extent that mercuric chloride and mercury forming complex ions with chlorine dissolved into said washing liquid by the washing of said exhaust gases are no longer reduced by reducing substances contained in said washing liquid, said oxidizing agent being suitable for oxidizing reducing substances formed in the washing liquid by the washing of the exhaust gases, whereby mercury in the form of mercuric chloride and mercury forming complex ions with chlorine is prevented from being reduced;
   (d) determining a value at which at least one of an oxidation-reduction potential, COD value, chlorine concentration, and oxidizing a sent concentration of said washing liquid, or a chlorine concentration in said exhaust gases, prevents said mercuric chloride and mercury forming complex ions with chlorine from being reduced; and
   (e) washing said exhaust gases with said washing liquid in which an amount of said oxidizing agent is controlled in order to maintain the value determined in step (d) so that the mercuric chloride and mercury forming complex ions with chlorine in said washing liquid are prevented from being reduced and so that excessive amounts of the oxidizing agent are prevented from being added to said washing liquid, thus preventing the occurrence of any corrosion of the waste incinerator.

2. A method according to claim 1, wherein said oxidation-reduction potential is measured by measuring means comprising an electrode made of silver chloride and platinum or silver chloride and gold.

3. A method according to claim 1, wherein said oxidizing agent comprises a substance selected from the group consisting of hypochlorite and hydrogen peroxide.

* * * * *